(12) United States Patent
Alonso et al.

(10) Patent No.: US 10,439,449 B2
(45) Date of Patent: Oct. 8, 2019

(54) COUPLING DEVICE MODULES FOR INDUCTIVE DATA TRANSMISSION (71) Applicant: Microsoft Technology Licensing, LLC, Redmond, WA (US)

(72) Inventors: Vicente Calvo Alonso, Piispanristi (FI); Antti Karilainen, Helsinki (FI); Esa Määttä, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 15/233,888

(22) Filed: Aug. 10, 2016

(65) Prior Publication Data
US 2018/0048192 A1 Feb. 15, 2018

(51) Int. Cl.
H02J 50/80 (2016.01)
H02J 50/10 (2016.01)
G06F 1/16 (2006.01)
H02J 7/02 (2016.01)
H02J 5/00 (2016.01)

(52) U.S. Cl.
CPC ............ *H02J 50/80* (2016.02); *G06F 1/1616* (2013.01); *H02J 5/00* (2013.01); *H02J 7/025* (2013.01); *H02J 50/10* (2016.02)

(58) Field of Classification Search
CPC . H02J 50/80; H02J 7/025; H02J 50/10; G06F 1/1616
See application file for complete search history.

(56) References Cited

U.S. PATENT DOCUMENTS

| 5,070,293 | A | 12/1991 | Ishii et al. |
| 7,271,677 | B2 | 9/2007 | Troyk et al. |
| 8,385,822 | B2 | 2/2013 | Chatterjee et al. |
| 8,437,695 | B2 | 5/2013 | Chatterjee et al. |
| 9,172,437 | B2 | 10/2015 | Tilvis et al. |
| 9,293,927 | B2 | 3/2016 | Soar |
| 2004/0232845 | A1 | 11/2004 | Baarman et al. |
| 2010/0109445 | A1 | 5/2010 | Kurs et al. |

(Continued)

FOREIGN PATENT DOCUMENTS

| EP | 2782262 A1 | 9/2014 |
| WO | 2013080068 A1 | 6/2013 |

OTHER PUBLICATIONS

"International Search Report and Written Opinion Issued in PCT Application No. PCT/US2017/045006", dated Oct. 2, 2017, 10 Pages.

(Continued)

*Primary Examiner* — Jared Fureman
*Assistant Examiner* — Duc M Pham (57) ABSTRACT A first device module comprises a first coupling arrangement; the first coupling arrangement comprising a first inductive coil, a first magnetic core positioned within the first inductive coil to form a first electromagnet, and a first control unit electrically connected to the first inductive coil. The first control unit is configured to supply first DC current to the first inductive coil to generate a first magnetic field to attract a second device module comprising a second magnetic element and a second inductive coil by magnetic force, and first AC current to the first inductive coil to inductively transmit a first data or power signal from the first inductive coil to the second inductive coil.

20 Claims, 5 Drawing Sheets (56) References Cited

U.S. PATENT DOCUMENTS

| | | |
|---|---|---|
| 2010/0129369 A1 | 5/2010 | Davies et al. |
| 2011/0040909 A1 | 2/2011 | Abdulla |
| 2011/0084652 A1 | 4/2011 | Julstrom et al. |
| 2011/0164471 A1 | 7/2011 | Baarman et al. |
| 2012/0112553 A1* | 5/2012 | Stoner, Jr. ............... H02J 5/005 307/104 |
| 2012/0194448 A1 | 8/2012 | Rothkopf |
| 2014/0162550 A1 | 6/2014 | Boyle et al. |
| 2016/0001663 A1* | 1/2016 | Chae ...................... B60L 1/006 307/9.1 |
| 2016/0094076 A1* | 3/2016 | Kasar ..................... H02J 7/025 320/103 |
| 2017/0103850 A1* | 4/2017 | Furiya ..................... H01F 38/14 |
| 2018/0137972 A1* | 5/2018 | Widmer ................ B60L 11/182 |

OTHER PUBLICATIONS

Shankland, Stephen, "Magnetic Nanoport links phones to accessories, cars, each other", Published on: Jan. 7, 2014, 3 pages, Available at: http://www.cnet.com/news/magnetic-nanoport-links-phones-to-accessories-cars-each-other/.

Flores, et al., "Calculation of the Magnetic Coupling between two Coils of Transcutaneous Energy System", In International Journal of Advanced Research in Computer and Communication Engineering, vol. 1, Issue 8, Oct. 2012, pp. 574-578.

Naasir, "How Wireless Power Transmission work", Published on: Nov. 18, 2014, 6 pages, Available at: http://www.howtechnologywork.com/how-wireless-power-transmission-work/.

* cited by examiner

COUPLING DEVICE MODULES FOR INDUCTIVE DATA TRANSMISSION

BACKGROUND

Various devices, such as portable or mobile devices, may be used as device modules to be coupled to other devices or device modules, for example, for data or power transfer purposes. Data and/or power signals may be transmitted between coupled devices using wireless transmission paths between the coupled devices or device modules. For example, data or power signals may be transmitted inductively.

Reliability and effectivity of inductive data or power transmission may be strongly affected by how accurately and reliably the devices or device modules are coupled together.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A first device module is disclosed which may comprise a first coupling arrangement comprising a first inductive coil, a first magnetic core positioned within the first inductive coil to form a first electromagnet, and a first control unit electrically connected to the first inductive coil. The first control unit may be configured to supply first DC current to the first inductive coil to generate a first magnetic field to attract a second device module, which second device module comprises a second magnetic element and a second inductive coil, by magnetic force. Further, the first control unit may be configured to supply first AC current to the first inductive coil to inductively transmit a first data or power signal from the first inductive coil to the second inductive coil.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The drawings in the FIGs are not to scale.

DETAILED DESCRIPTION

The detailed description provided below in connection with the appended drawings is intended as a description of a number of embodiments and is not intended to represent the only forms in which the embodiments may be constructed, implemented, or utilized.

At least some of the embodiments may allow, for example, secure attachment of two device modules to ensure reliable and effective data and/or power signal transmission between the device modules. Further, the attachment and data and/or power signal transmission may be carried out using compact coupling arrangements with reasonably limited space requirements, allowing incorporation of coupling arrangements in great variety of different device types and sizes. With the attachment being based on one or more electromagnets, magnetic field generating magnetic force for carrying out the attachment may be switched off when it is not needed, thereby preventing any undesired effects such magnetic field could have on objects in the proximity of the device module. Further, electromagnets may provide a strong magnetic force allowing secure attachment of substantially large device modules also.

Figure 1:
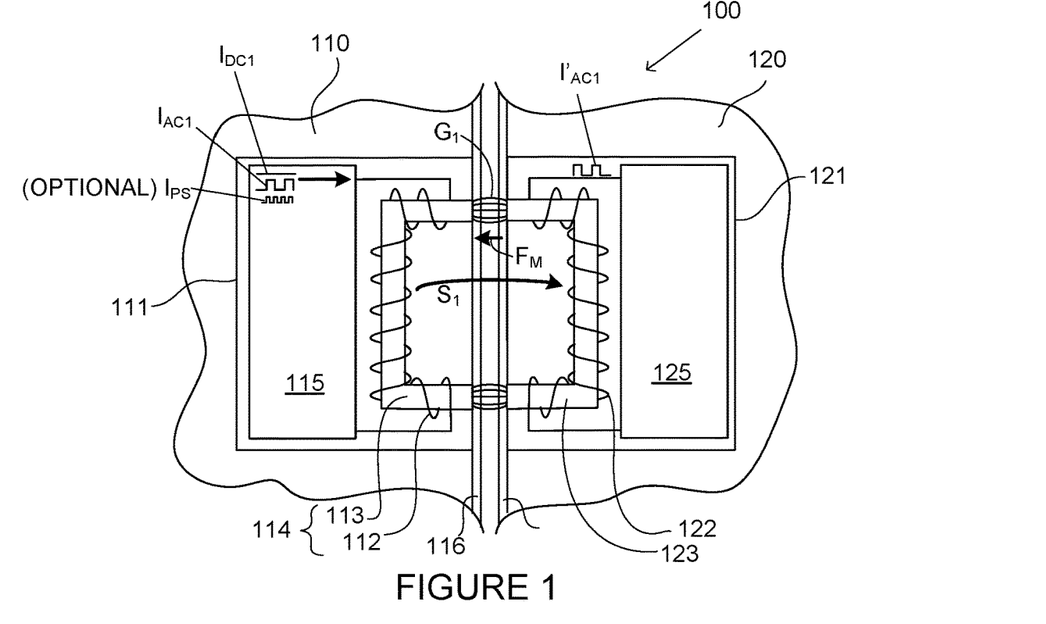
FIG. 1 illustrates schematically a system with a first and a second device module.

The system 100 of FIG. 1 comprises a first device module 110 and a second device module 120, only a part of each being shown in FIG. 1, illustrated as schematic sectional views. In FIG. 1, the first and the second device modules are illustrated as coupled together for inductive data and/or power transmission therebetween. Coupling may be released, and the first and the second device modules, which may be manufactured and sold separately, may also lie and be used as separate device modules or devices, each of which may be operable without being coupled to any other device module.

"Coupling" refers to such connection and positioning of the first and the second device modules that said inductive data and/or power transmission is possible. For example, proper coupling requires the two device modules to be held at sufficient close proximity to enable secure and efficient inductive transmission.

For said coupling purposes, the first device module 110 comprises a first coupling arrangement 111 comprising a first inductive coil 112, a first magnetic element in the form of a first magnetic core 113 positioned within the first inductive coil to form a first electromagnet 114, and a first control unit 115 electrically connected to the first inductive coil.

"Inductive coil" refers to a coil wound from a conductor wire and being capable of inductively transmitting and/or receiving a data and/or power signal in result of electromagnetic induction.

"Magnetic core" refers to a piece of a magnetic, preferably ferromagnetic or ferrimagnetic, material positioned partially or completely within an inductive coil, i.e. within an inner volume defined by the loops of the coil, so as to concentrate the magnetic flux generated in result of DC (Direct Current) current flowing in the inductive coil. Thereby, an electromagnet is formed by the inductive coil and the magnetic core, wherein magnetic field generated by the electromagnet can be controlled by controlling the DC current supplied to the inductive coil.

Being "electrically connected" to an inductive coil refers to connection formed, for example, by electrically conducting wires between the inductive coil and the control unit, via which connection currents may be supplied to and/or received from the inductive coil.

The second device module 120 comprises a second coupling arrangement 121 comprising a second inductive coil 122, a second magnetic element 123, and a second control unit 125 electrically connected to the second inductive coil. In the example illustrated in FIG. 1, the second magnetic element is positioned within the second inductive coil and it may comprise a permanent magnet or, for example, a piece of a ferromagnetic material such as iron.

In other embodiments, the second magnetic element may be positioned outside the second inductive coil.

The first control unit 115 is configured to supply first DC (direct current) current $I_{DC1}$ to the first inductive coil 112 to generate a first magnetic field $G_1$ to attract the second device module comprising the second magnetic element, by magnetic force $F_M$. In result of the first DC current, the first electromagnet thus generates a magnetic field $G_1$ which further generates a magnetic force $F_M$ attracting the second magnetic element 123 and thereby the entire second device module 120. Thereby, the first and the second device may be releasably attached to each other, "releasably" referring to the fact that the magnetic field and the corresponding magnetic force may be substantially removed by stopping the first DC current supply to the first inductive coil.

The first control unit is further configured to supply first AC current $I_{AC1}$ to the first inductive coil 112 to inductively transmit a first data or power signal $S_1$ from the first inductive coil to the second inductive coil 122.

The same first inductive coil 112 and the first control unit 115 electrically connected to it thereby advantageously serve for both activating the first electromagnet 114, and for inductively transmitting the first data or power signal $S_1$.

During the inductive transmission, an induced first AC current $I'_{AC1}$ will be generated inductively in the second inductive coil 122.

The second control unit 121 is configured to receive the first data or power signal $S_1$ transmitted from the first inductive coil to the second inductive coil for further processing and/or for storage for later use. Said receiving may be carried out by detecting and appropriately processing the induced first AC current $I'_{AC1}$ generated in the second inductive coil 122.

A data signal may comprise any appropriate type of data, arranged in any appropriate signal form, possibly having any appropriate kinds of pulses, transferable as an AC current signal. In the data transmission, any appropriate digital or analog signal transmission processes and practices may be used. For example, in the case of digital signal transmission, various modulation schemes may be used, such as amplitude-shift keying (ASK), frequency-shift keying (FSK), phase-shift keying (PSK), and (quadrature amplitude modulation) QAM, including all their variants.

A power signal may comprise signal for supplying electrical power in any appropriate signal form from a first device module to a second device module for directly operating the second device module by the transmitted power and/or for charging a battery of the second device module.

The first device module may comprise a battery for providing the power required to operate the first device module itself, to supply the first DC current to activate the first electromagnet, and to supply the possible power to be transferred as a first power signal to the second device module. Alternatively, or in addition, a first device module may connectable to mains power or to another external power source.

The first device module 110 may comprise any activation arrangement via which the user of the system may activate and deactivate the supply of the first DC current by the first control unit to the first inductive coil and thereby the attraction between the first and the second device modules.

Alternatively, or in addition, there first control unit 115 may initiate the supply of the first DC current at least partially automatically. For example, the first control unit may 115 be configured to carry out a method as illustrated in FIG. 2, comprising supplying a presence detection current $I_{PS}$ to the first inductive coil 112.

Figure 2:
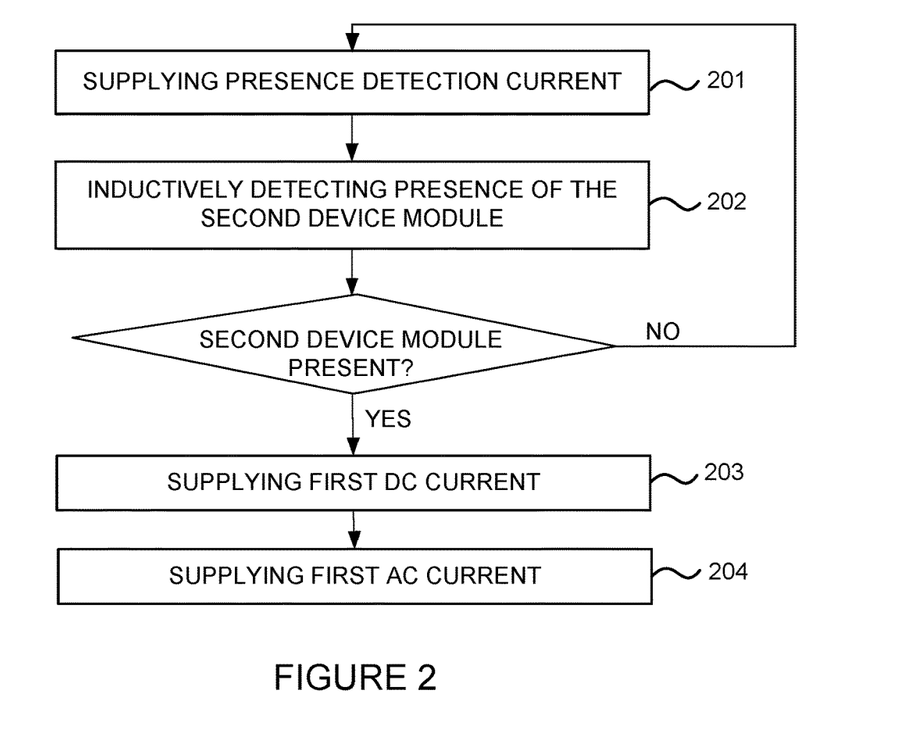
FIG. 2 illustrates as a flow diagram a method for coupling two device modules and inductively transferring signals between them.

The method of FIG. 2 starts by supplying, in operation 201, presence detection current to the first inductive coil, and comprises further, in operation 202, inductively detecting presence of the second device module in the proximity of the first device module, and initiating, in operation 203, on the basis of detected presence of the second device module, supply of the first DC current to the first inductive coil.

The presence detection current may be in the form of any appropriate current signal suitable for inductive proximity sensing. Also the actual detection may be based on any appropriate signal processing algorithms and operations suitable for detecting the presence of the second device module. For example, detection may be based on detecting change of impedance of a circuit, a part of which the first inductive coil forms, the impedance of which being affected by the second inductive coil brought in close proximity of the first inductive coil.

Detecting "presence" of the second device module refers to determining whether there is a second device module present in the proximity of the first device module. Thereby, the result of the detecting may be determining that there is not, or that there is, a second device module present in the proximity of the first device module.

The first device module may be configured to transmit, automatically or in response to an activation user input, the presence detection current continuously or at predetermined intervals to the first inductive coil until presence of the second device module in sufficient close proximity of the first device module is detected. Thereafter, supply of the first DC current to the first inductive coil may be initiated, in operation 203, to attract the second device module and to attach the first and the second device modules magnetically together for data and/or power signal transmission. Supplying first AC current to the first inductive coil in operation 204 may then be initiated to initiate signal transmission between the first and the second device modules.

The first control unit may be further configured, once having initiated the supply of the first AC current to transmit the first data or power signal, to supply presence detection current to the first inductive coils, for example, at predetermined intervals, to detect whether the second device module is still appropriately positioned for the inductive signal transmission.

To carry out the operations discussed above for which the first and the second control units are configured to, the first and the second control units 115, 125 may comprise any appropriate electrical, electronic, computing, and/or data processing components, modules, and sub-units. For example, any of the first and the second control units may be implemented in accordance with the control unit of FIG. 3.

Figure 3:
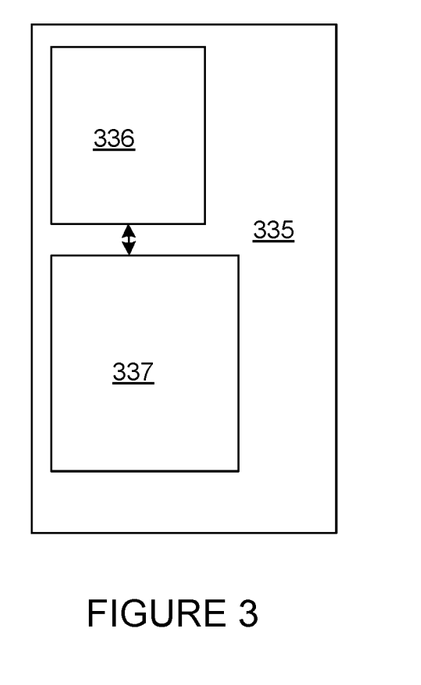
FIG. 3 illustrates schematically a control unit to be used in a first and/or a second device module.

In the example of FIG. 3, a control unit 335 comprises an electronics sub-unit 336 and a computing sub-unit 337 connected to each other so that the computing sub-unit may control the electronics unit and receive signals therefrom.

The electronics sub-unit 336 may comprise any appropriate circuits and components forming, for example, any appropriate filters, amplifiers, and power source elements.

To control the operation of the electronics sub-unit 336 and, for example, any power source element therein to supply currents to an inductive coil electrically connected to the control unit, the computing sub-unit may comprise, for example, at least one processor and at least one memory coupled to the at least one processor, the memory storing program code instructions which, when run on the at least one processor, cause the processor to perform the operations action(s) at issue.

Alternatively, or additionally, the operations of the computing sub-unit, or more generally, of the control unit, may be performed, at least partially, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In other embodiments, there may be, instead of separate electronics and computing sub-units in a control unit, one or more common units or sub-units configured to carry out all operations of the control unit.

In the example of FIG. 1, the first and the second device modules have a first and a second outer casing 116, 126, respectively. An "outer casing" refers to a housing or shell of a device module enclosing the rest of the device module and forming the outer surface of the device module.

The first control unit, including the first magnetic core 113, is located within the first outer casing, i.e. behind the first outer casing 116 in the interior of the device module enclosed by the first outer casing, without any opening in the outer casing for the first magnetic core 113. Similarly, the second control unit, including the second magnetic element 123, is located within the second outer casing 126. Then, the first magnetic core 113 and the second magnetic element 123 cannot be brought in direct contact to each other. Sufficient magnetic force for secure attachment between the first and the second device modules may be provided by adjusting the first DC current appropriately.

In other embodiments, a first outer casing of a first device module and/or a second outer casing of a second device module may comprise an opening via which the first magnetic core and/or the second magnetic element may be exposed to the exterior of the device module.

Figure 4:
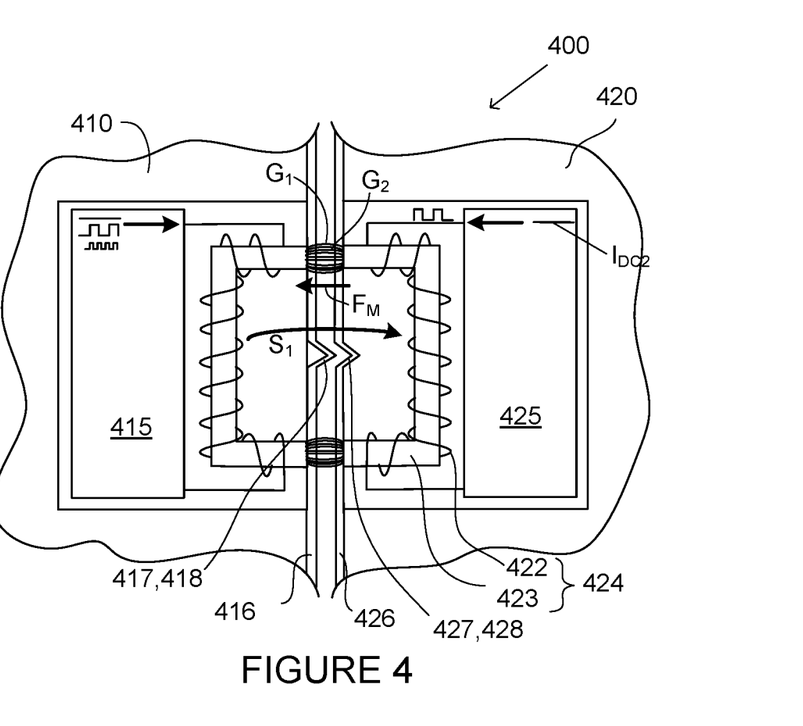
FIGS. 4 to 9 illustrate schematically various systems with a first and a second device module.

The system 400 of FIG. 4 differs from those discussed above with reference to FIGS. 1 to 3 in that the second magnetic element of the second device module 420 is implemented as a second magnetic core 423 positioned within the second inductive coil 422, whereby the second magnetic core and the second inductive coils form a second electromagnet 424. As a further difference, the second control unit 425 is further configured to supply second DC current $I_{DC2}$ to the second inductive coil to generate a second magnetic field $G_2$ to attract the first device module by magnetic force. In the example of FIG. 4 the first and the second device modules may thereby be attached together by a total magnetic force $F_M$ which results from the first and the second magnetic fields $G_1$, $G_2$. Thereby, a strong force may be advantageously generated to provide a strong attachment and thereby secure coupling between the first and the second device modules.

In the example, of FIG. 4, the same second inductive coil 422 and the second control unit 425 electrically connected to it thereby advantageously serve for both activating the second electromagnet 424, and for inductively receiving the first data or power signal $S_1$.

In the example of FIG. 4, the first outer casing 416 of the first device module 410 comprises a first guiding arrangement in the form of a first guiding structure 417 having a protrusion 418 extending outwards from the general surface plane of the first outer casing. The second outer casing 426 comprises a second guiding structure 427 having a complementary recess 428 extending inwards from the general surface plane of the second outer casing, and being shaped and dimensioned to receive the protrusion 418 of the first guiding structure when the first device module is brought into close proximity with the second device module.

The first and the second guiding structures may guide, when the first and the second device modules are brought together, positioning of the first device module with the first magnetic element and the first inductive coil at predetermined positions relative to the second coupling arrangement to allow safe inductive data transmission coupling between the first and the second coupling arrangements.

In other embodiments, different guiding structures with any appropriate type, number, and positioning may be present.

In yet other embodiments, different types of first and second guiding arrangements may be present, not necessarily comprising any specific guiding structures but, for example, visual markings indicating proper positioning of a first and a second device module relative to each other.

Embodiments are also possible without any specific guiding arrangement in first and/or second device module.

Any guiding arrangement as discussed above may be present also in a first and/or second device module in accordance with those discussed above with reference to FIGS. 1 to 3.

Figure 5:
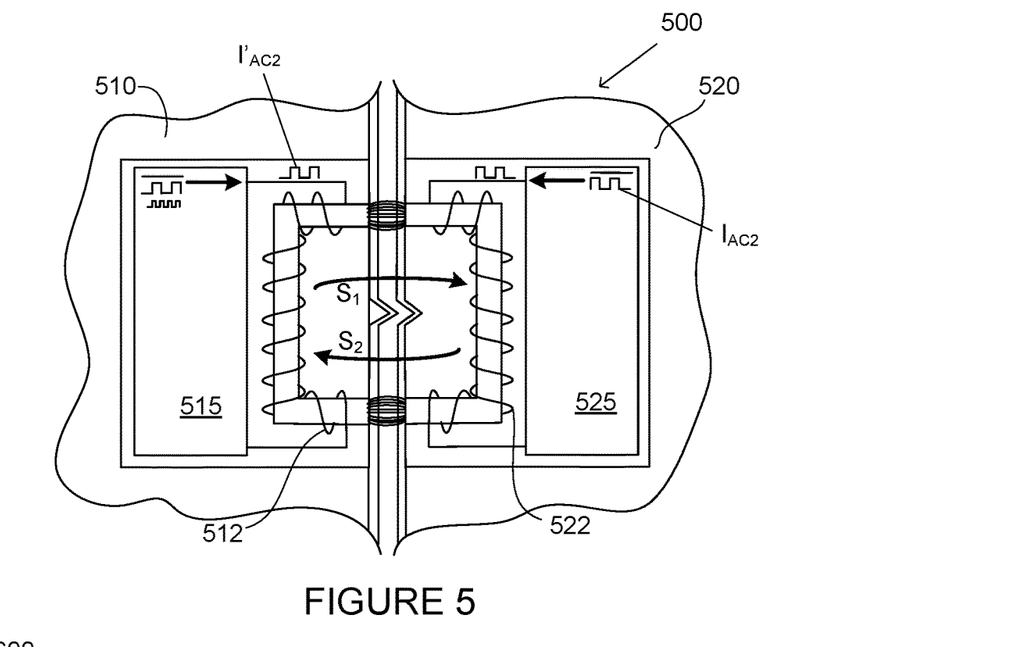

The system 500 of differs from that of FIG. 4 in that the second control unit 525 of the second device module 520 is further configured to supply second AC current $I_{AC2}$ to the second inductive coil 522 of the second coupling arrangement of the second device module to inductively transmit a second data or power signal $S_2$ from the second inductive coil 522 to the first inductive coil 512. In addition, the first control unit 515 of the first device module 510 is further configured to receive the second data or power signal $S_2$ inductively transmitted from the second inductive coil 522 to the first inductive coil 512 by inducing to the latter induced second AC current $I'_{AC2}$. Thereby, the first and the second device modules 510, 520 of the system 500 of FIG. 5 may carry out bi-directional or bi-lateral data or power transfer.

Figure 6:
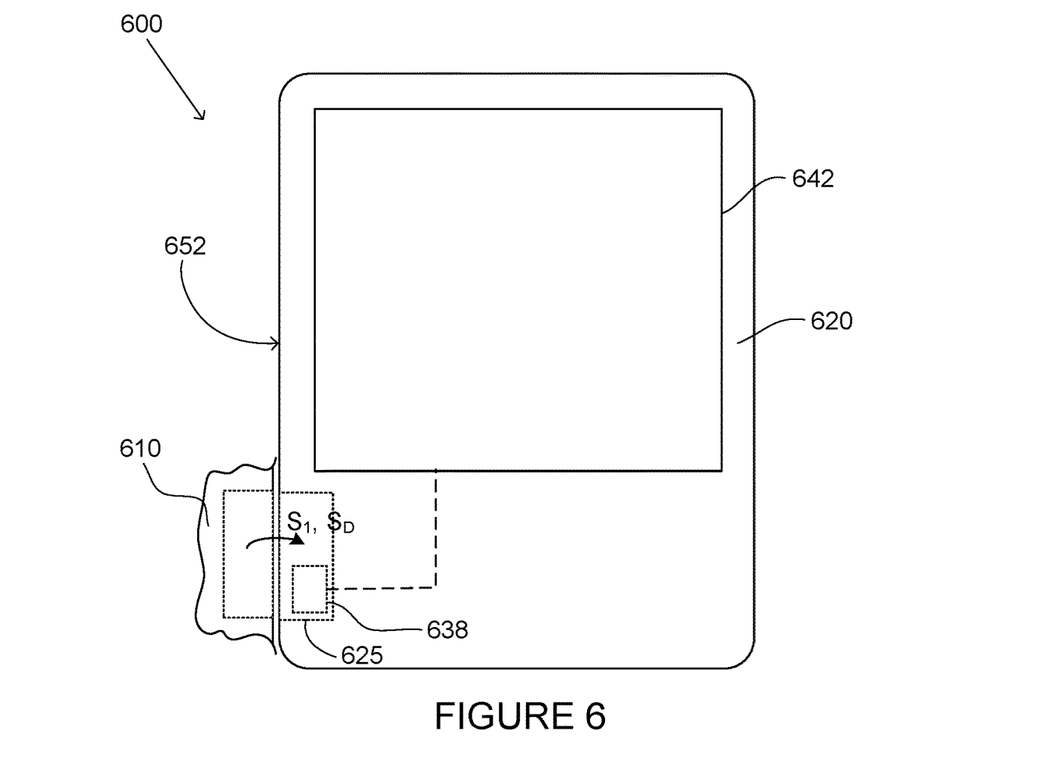

The system 600 of FIG. 6 may be in accordance with any of the systems discussed above with reference to FIGS. 1 to 5.

The second device module 620 of FIG. 6, illustrated as schematic front view, comprises a second display 642, and the second control unit 625 comprises a second display controller 638 electrically connected to the second display 642. The first data or power signal $S_1$ comprises a display control signal $S_D$, and the second display controller 638 is configured to control or drive the second display on the basis of the display control signal.

The second device module 620 of FIG. 6 has a substantially plate-like shape having a peripheral edge 652, and the second coupling arrangement 621 comprising, in addition to the second control unit 625, the second magnetic element (not illustrated) and the second inductive coil (not illustrated), is located at the peripheral edge.

A plate-like shape refers to a three-dimensional shape extending substantially along a plane, which may be slightly curved, and having dimensions in that plane substantially larger than the maximum dimension in direction(s) perpendicular to that plane. The peripheral edge refers to the contour of the plate-like second device module along said plane.

Position of the second magnetic element and the second inductive coil at the peripheral edge 652 enables device configurations where the second device module is attached to a first device module via the edge thereof. This may be convenient in various applications where the second device module is used as a display part of a modular device assembly.

The second device module 620 of FIG. 6 may be a specific display module capable of operating as a display or screen part of a modular device, the first device module of which not comprising any display. For example, the second device module 620 may form a separable screen of a laptop computer. Alternatively, the second device module may be a stand-alone device, such as a smartphone or a tablet computer, which may be coupled to another, possibly similar first device module to form one single modular device.

Figure 7:
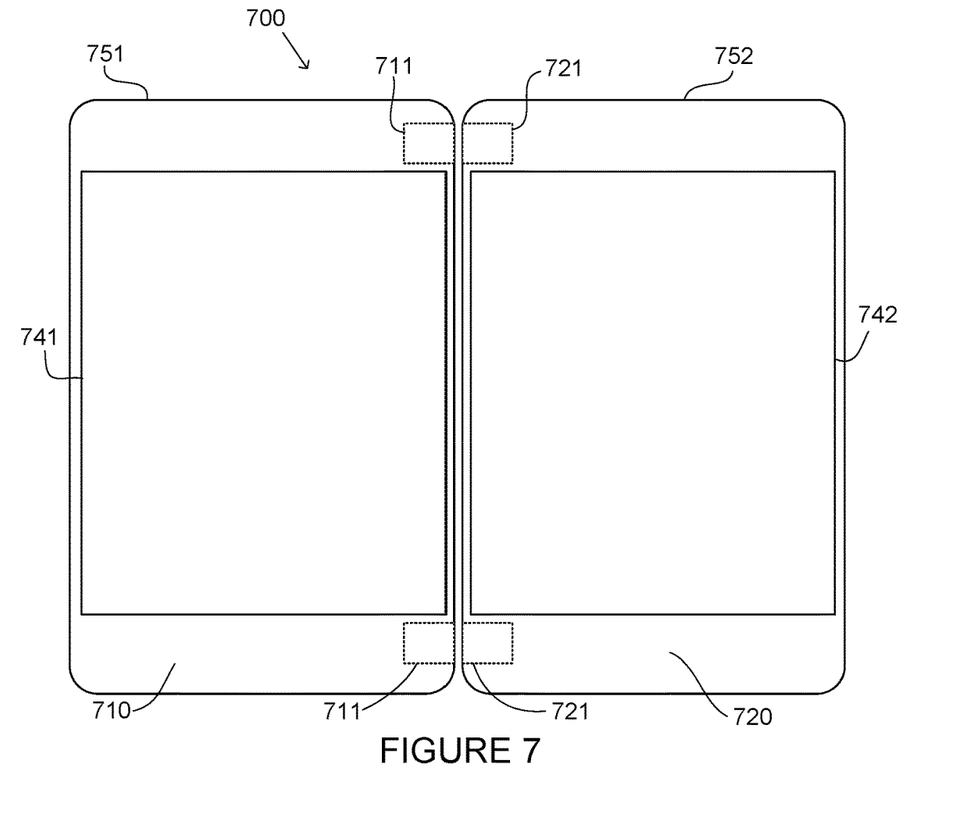

The system 700 of FIG. 7 comprises a first device module 710 and a second device module 720, the latter being generally in accordance with any of the device modules discussed above with reference to FIG. 6. The first device module may be generally in accordance with any of the first device modules discussed above with reference to FIGS. 1 to 6.

The first device module 710 of FIG. 7 has a first display 741.

The first device module 710 of FIG. 7 comprises two first coupling arrangements 711 which may be in accordance with any of the first coupling arrangements discussed above with reference to FIGS. 1 to 6.

The second device module 720 comprises a second display 742 and two second coupling arrangements 721 which may be in accordance with any of the second coupling arrangements discussed above with reference to FIGS. 1 to 6.

A display control signal may comprise large amount of data needed to drive the second display. The two pairs of first and second coupling arrangements may serve for ensuring sufficient data transferring capacity for transferring a display control signal from one device module to another. Alternatively, one of the coupling arrangement pairs may be used for transferring a display control signal whereas the other one may be used for other purposes, such as transferring a power signal to the second device module.

In other embodiments, there may be any appropriate other number of coupling arrangements in the first and the second device modules.

The first and the second coupling arrangements 711, 721 are located at peripheral edges 751, 752 of the first and the second device modules so that the first and the second device modules may be attached together via their edges.

In the system of FIG. 7, the first and the second device modules are parts of and form a modular device, the first and the second displays thereof forming, with the first and the second modules attached to each other, an operationally combined, two-part display.

An "operationally combined" two-part or splitted display refers to the operation and driving of the first and the second displays as parts of one larger modular display with the information content to be displayed being shared between those two displays. Thereby, the system 700 of FIG. 7 allows implementation of an operationally single display which is larger than any of the first and the second displays.

Although not illustrated in the drawings, there may be more than one first and/or second coupling arrangement also in any of the first and the second device modules discussed above with reference to FIGS. 1 to 6.

Any of the first device modules 110, 410, 510, 610, 710 of FIGS. 1, 4, 5, 6, and 7 may be, for example, a laptop computer, a tablet computer, a smartphone, a mobile phone, a game console or a part of such, a wearable electronic device, a vehicle dashboard or a part of such, a digital camera, a wireless charger, or any other appropriate type of device or a device module for a system with at least two device modules, from which device or device module data and/or power signal is to be inductively transmitted to another, second device module.

Any of the second device modules 120, 420, 520, 620, 720 of FIGS. 1, 4, 5, 6, and 7 may be, for example, a laptop computer, a tablet computer, a smartphone, a mobile phone, a game console or a part of such, a wearable electronic device, a digital camera, or a display module, or any other appropriate type of device or a device module for a system with at least two device modules, to device or device module data and/or power signal is to be inductively transmitted from another, first device module.

The first and the second device modules may be device modules of same type. For example, they may both be tablet computers or smartphones. Alternatively, they may be of different types of device modules, such as a wireless charger as the first device module, and a device of any appropriate type to be charged as the second device module. In another example, the first device module may be a first part of a computer, and the second device module may be second part thereof, releasably attachable to the first part. One of such parts may comprise a display and be implanted as a display module, whereas the other part may comprise the core operational system of the computer. Instead of being a mere display module, the part having a display may be a fully operational tablet computer. Then, the other part may be an accessory part comprising, for example, an additional keyboard.

Figure 8:
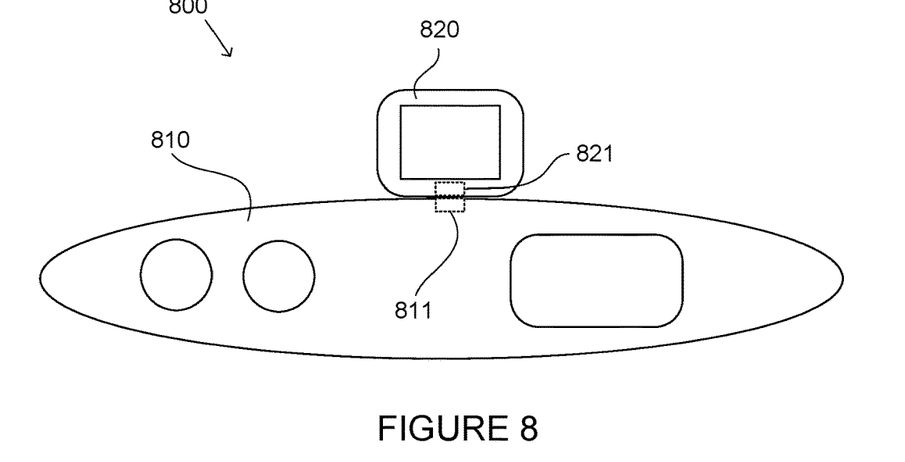

The system 800 of FIG. 8 represents one example of possible applications of a system comprising a first and a second device module. The system comprises a vehicle dashboard 810 as a first device module, which may be in accordance with any of the first device modules discussed above with reference to FIGS. 1 to 6. A display module 820 as a second device module, which may be in accordance with any of the second device modules discussed above with reference to FIG. 6, is coupled, by a first coupling arrangement 811 in the dashboard and a second coupling arrangement 821 in the display module, to the vehicle dashboard for inductive data and/or power transmission between the dashboard and the display module.

Figure 9:
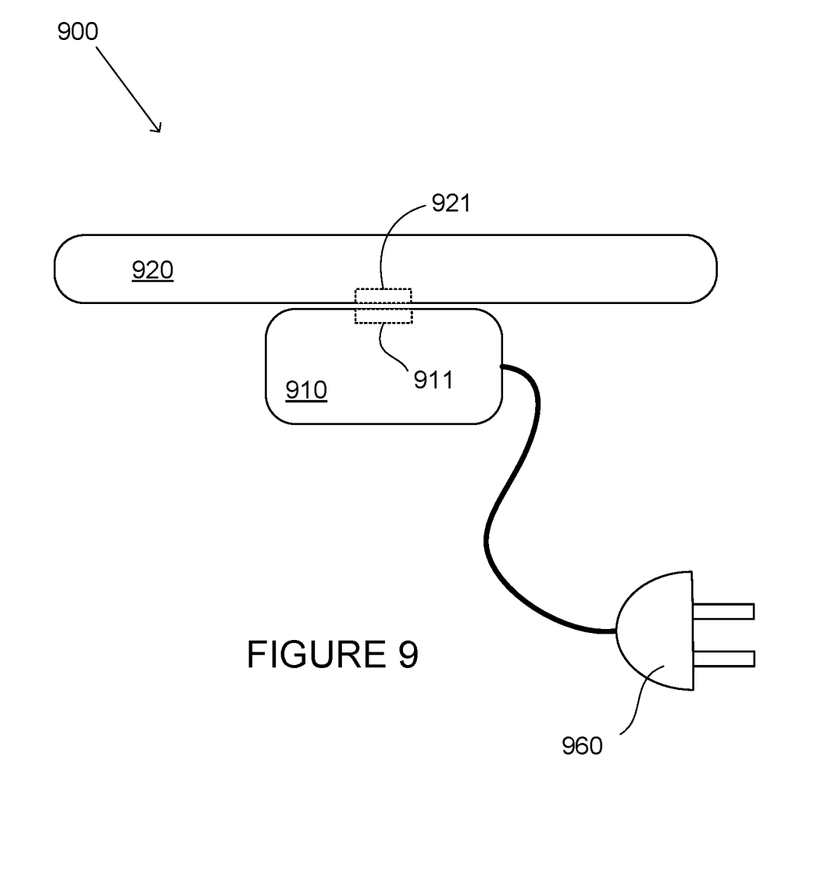

Another application example is illustrated in FIG. 9, wherein a the system 900 comprises a wireless charger 910 as a first device module, connectable to mains power by a plug 960, and a second device module 920 which may be implemented as any of the examples mentioned above, such as a smartphone or a tablet computer. The charger and the second device module are coupled by a first coupling arrangement 911 contained in the wireless charger and a second coupling arrangement 921 contained in the second device module to form a two-part system. A power signal may be inductively transmitted from the first coupling arrangement 911 to the second coupling arrangement 921.

Some embodiments are further discussed shortly in the following.

In a first aspect, a first device module comprises a first coupling arrangement; the first coupling arrangement comprising a first inductive coil, a first magnetic core positioned within the first inductive coil to form a first electromagnet, and a first control unit electrically connected to the first inductive coil; the first control unit being configured to supply first DC current to the first inductive coil to generate a first magnetic field to attract a second device module comprising a second magnetic element and a second inductive coil by magnetic force, and to supply first AC current to the first inductive coil to inductively transmit a first data or power signal from the first inductive coil to the second inductive coil.

In an embodiment, the first control unit is configured to supply presence detection current to the first inductive coil and to inductively detect presence of the second device module in the proximity of the first device module, and to initiate the supply of the first DC current to the first inductive coil on the basis of detected presence of the second device module.

In an embodiment, which may be in accordance with the previous embodiment, the first device module has a first outer casing, the first magnetic core of the coupling arrangement being located within the first outer casing.

In an embodiment, which may be in accordance with any of the preceding embodiments, the first device module has a first outer casing comprising a first guiding arrangement configured to guide positioning of the second device module with the second magnetic element and the second inductive coil at predetermined positions relative to the first coupling arrangement.

In an embodiment, which may be in accordance with any of the preceding embodiments, the first control unit is further configured to receive a second data or power signal inductively transmitted from the second inductive coil of the second device module to the first inductive coil.

In an embodiment, which may be in accordance with any of the preceding embodiments, the first device module comprises at least two first coupling arrangements.

In an embodiment, which may be in accordance with any of the preceding embodiments, the first device module is implemented as one of a laptop computer, a tablet computer, a smartphone, a mobile phone, a game console, a wearable electronic device, a vehicle dashboard, a digital camera, and a wireless charger.

In a second aspect, a second device module comprises a second coupling arrangement; the second coupling arrangement comprising a second inductive coil, a second magnetic core positioned within the second inductive coil to form a second electromagnet, and a second control unit electrically connected to the second inductive coil; the second control unit being configured to supply second DC current to the second inductive coil to generate a second magnetic field to attract a first device module comprising a first magnetic element and a first inductive coil by magnetic force, and to receive a first data or power signal inductively transmitted from the first inductive coil of the first device module to the second inductive coil.

In an embodiment, the second device module has a second outer casing, the second magnetic core of the coupling arrangement being located within the second outer casing.

In an embodiment, which may be in accordance with the previous embodiment, the second device module has a second outer casing comprising a second guiding arrangement configured to guide positioning of the first device module with the first magnetic element and the first inductive coil at predetermined positions relative to the second coupling arrangement.

In an embodiment, which may be in accordance with any of the preceding embodiments of the second aspect, the second control unit is further configured to supply second AC current to the second inductive coil to inductively transmit a second data or power signal from the second inductive coil to the first inductive coil.

In an embodiment, which may be in accordance with any of the preceding embodiments of the second aspect, the second device module comprises a display, wherein the first data or power signal comprises a display control signal, and the second control unit comprises a second display controller configured to control the display on the basis of the display control signal.

In an embodiment in accordance with the previous embodiment, the second device module has s substantially plate-like shape having a peripheral edge, wherein the second magnetic element and the second inductive coil are located at the peripheral edge.

In an embodiment, which may be in accordance with any of the preceding embodiments of the second aspect, the second device module comprises at least two second coupling arrangements.

In an embodiment, which may be in accordance with any of the preceding embodiments of the second aspect, the second device module is implemented as one of a laptop computer, a tablet computer, a smartphone, a mobile phone, a game console, a wearable electronic device, a digital camera, and a display module.

In a third aspect, a system comprises: a first device module comprising a first coupling arrangement comprising a first inductive coil, a first magnetic core positioned within the first inductive coil to form a first electromagnet, and a first control unit electrically connected to the first inductive coil; and a second device module comprising a second coupling arrangement comprising a second inductive coil, a second magnetic element, and a second control unit electrically connected to the second inductive coil; the first control unit being configured to supply first DC current to the first inductive coil to generate a first magnetic field to attract the second magnetic element, thereby releasably attaching the first and the second device modules together by magnetic force; and to supply first AC current to the first inductive coil to inductively transmit a first data or power signal from the first inductive coil to the second inductive coil; the second control unit being configured to receive the first data or power signal. The first device module may be in accordance with the first device module of the first aspect or any specific embodiment thereof discussed above.

In an embodiment, the second magnetic element is implemented as a second magnetic core positioned within the second inductive coil to form a second electromagnet; the second control unit being configured to supply second DC current to the second inductive coil to generate a second magnetic field to increase the magnetic force by which the first and the second device modules are attached together by magnetic force. In this embodiment, the second device element may be in accordance with the second device module of the second aspect or any specific embodiment thereof discussed above.

In an embodiment, which may be in accordance with the previous embodiment, the first device module has a first outer casing comprising a first and the second device module has a second outer casing, wherein the first and the second outer casings comprise a first and a second guiding structure, respectively, to guide positioning of the first device module with the first coupling arrangement at predetermined positions relative to the second coupling arrangement of the second device module, one of the first and the second guiding structures comprising a protrusion and the other one comprising a complementary recess configured to receive the protrusion.

In an embodiment, which may be in accordance with any of the preceding embodiments of the third aspect, the second device module comprises a second display and a second display controller configured to drive the second display on the basis of the first data signal received by the second inductive coil.

In an embodiment in accordance with the previous embodiment, the first device module comprises a first display, the first and the second device modules forming a modular device, the first and the second displays forming, with the first and the second modules attached to each other, an operationally combined, two-part display.

The embodiments illustrated and described herein as well as embodiments not specifically described herein but within the scope of aspects of the claims constitute exemplary means for coupling a first and a second device module together, for attaching such device modules together by magnetic force, and for inductively transmitting data and/or power signal(s) between the coupled device modules. For example, the first control units, when configured to supply DC and/or AC currents and receiving signals, constitute exemplary means for supplying such currents and receiving signals. As another example, the first and the second inductive coils constitute exemplary means for inductively transmitting signals between the first and the second coupling arrangements. As yet another example, the first and the second guiding arrangements, when configured to guide positioning of the first and the second device modules, constitute exemplary means for guiding said positioning.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and portable devices, for example, in lap upper computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A first device module, comprising:
   a first coupling arrangement comprising a first inductive coil, a first magnetic core positioned within the first inductive coil to form a first electromagnet, and a first control unit electrically connected to the first inductive coil,
   wherein the first control unit is configured to selectively supply and cease supply of a first DC current to the first inductive coil to generate and cease a first magnetic field for selectively attracting and detaching, respectively, a second device module comprising a second magnetic element and a second inductive coil by magnetic force, and to supply first AC current to the first inductive coil to inductively transmit a first data signal from the first inductive coil to the second inductive coil.

2. A first device module as defined in claim 1, wherein the first control unit is configured to supply presence detection current to the first inductive coil and to inductively detect presence of the second device module in the proximity of the first device module, and to initiate the supply of the first DC current to the first inductive coil on the basis of detected presence of the second device module.

3. A first device module as defined in claim 1, having a first outer casing, the first magnetic core of the coupling arrangement being located within the first outer casing.

4. A first device module as defined in claim 1, having a first outer casing comprising a first guiding arrangement configured to guide positioning of the second device module with the second magnetic element and the second inductive coil at predetermined positions relative to the first coupling arrangement.

5. A first device module as defined in claim 1, wherein the first control unit is further configured to receive a second data or signal or a power signal inductively transmitted from the second inductive coil of the second device module to the first inductive coil.

6. A first device module as defined in claim 1, comprising at least two first coupling arrangements.

7. A first device module as defined in claim 1, implemented as one of a laptop computer, a tablet computer, a smartphone, a mobile phone, a game console, a wearable electronic device, a vehicle dashboard, a digital camera, and a wireless charger.

8. A second device module, comprising:
   a second coupling arrangement;
   the second coupling arrangement comprising a second inductive coil, a second magnetic core positioned within the second inductive coil to form a second electromagnet, and a second control unit electrically connected to the second inductive, the second control unit being configured to selectively supply and cease supply of a second DC current to the second inductive coil to generate and cease a second magnetic field for attracting and detaching, respectively, a first device module comprising a first magnetic element and a first inductive coil by magnetic force, and to receive a first AC data signal inductively transmitted from the first inductive coil of the first device module to the second inductive coil.

9. A second device module as defined in claim 8, having a second outer casing, the second magnetic core of the second coupling arrangement being located within the second outer casing.

10. A second device module as defined in claim 8, having a second outer casing comprising a second guiding arrangement configured to guide positioning of the first device module with the first magnetic element and the first inductive coil at predetermined positions relative to the second coupling arrangement.

11. A second device module as defined in claim 8, wherein the second control unit is further configured to supply second AC current to the second inductive coil to inductively transmit a second data or power signal from the second inductive coil to the first inductive coil.

12. A second device module as defined in claim 8, comprising a display, wherein the first data or power signal comprises a display control signal, and the second control unit comprises a second display controller configured to control the display on the basis of the display control signal.

13. A second device module as defined in claim 12, having a substantially plate-like shape having a peripheral edge, wherein the second magnetic element and the second inductive coil are located at the peripheral edge.

14. A second device module as defined in claim 8, comprising at least two second coupling arrangements.

15. A second device module as defined in claim 8, implemented as one of a laptop computer, a tablet computer, a smartphone, a mobile phone, a game console, a wearable electronic device, a digital camera, and a display module.

16. A system comprising:
- a first device module comprising a first coupling arrangement comprising a first inductive coil, a first magnetic core positioned within the first inductive coil to form a first electromagnet, and a first control unit electrically connected to the first inductive coil; and
- a second device module comprising a second coupling arrangement comprising a second inductive coil, a second magnetic element, and a second control unit electrically connected to the second inductive coil;
- the first control unit being configured to selectively supply and cease supply of a first DC current to the first inductive coil to generate and cease a first magnetic field for attracting and detaching, respectively, the second magnetic element, and to supply first AC current to the first inductive coil to inductively transmit a first data and power signal from the first inductive coil to the second inductive coil;
- the second control unit being configured to receive the first data or power signal.

17. A system as defined in claim 16, wherein the second magnetic element is implemented as a second magnetic core positioned within the second inductive coil to form a second electromagnet; the second control unit being configured to supply second DC current to the second inductive coil to generate a second magnetic field to increase the magnetic force by which the first and the second device modules are attached together by magnetic force.

18. A system as defined in claim 16, the first device module having a first outer casing comprising a first and the second device module having a second outer casing, wherein the first and the second outer casings comprise a first and a second guiding structure, respectively, to guide positioning of the first device module with the first coupling arrangement at predetermined positions relative to the second coupling arrangement of the second device module, one of the first and the second guiding structures comprising a protrusion and the other one comprising a complementary recess configured to receive the protrusion.

19. A system as defined in claim 16, wherein the second device module comprises a second display and a second display controller configured to drive the second display on the basis of the first data signal received by the second inductive coil.

20. A system as defined in claim 19, wherein the first device module comprises a first display, the first and the second device modules forming a modular device, the first and the second displays forming, with the first and the second modules attached to each other, an operationally combined, two-part display.

* * * * *